COMPANDOR THAT SUPPLIES GAIN TO THE SYSTEM

Filed March 14, 1966 2 Sheets-Sheet 1

INVENTORS
JULIAN ALONSO GARCIA
JACKIE HARRELL KASELL
BY
ATTORNEY

Oct. 15, 1968 J. A. GARCIA ET AL 3,406,357

COMPANDOR THAT SUPPLIES GAIN TO THE SYSTEM

Filed March 14, 1966 2 Sheets-Sheet 2

United States Patent Office 3,406,357
Patented Oct. 15, 1968

3,406,357
COMPANDOR THAT SUPPLIES GAIN TO THE SYSTEM

Julian Alonso Garcia and Jackie Harrell Kasell, Raleigh, N.C., assignors to International Telephone and Telegraph Corporation, New York, N.Y., a corporation of Maryland Filed Mar. 14, 1966, Ser. No. 533,911
7 Claims. (Cl. 333—14)

ABSTRACT OF THE DISCLOSURE

The invention provides a campandor for pole mounting in a subscriber carrier telephone system. The primary object is to power the entire campandor from the central office battery, and this requires a minimization of current drain. Among other things, this minimization is accomplished by a double use of circuit elements; for example, the campandor not only provides its campandor functions—but also supplies gain.

This invention relates to compandors, and more particularly to compandors having extremely low power requirements.

Compandors improve the signal-to-noise ratio of transmission circuits, particularly voice transmission channels used in long distance telephony. This improvement results from an interaction of a "compressor" circuit on a transmitting end and an "expandor" circuit on the receiving end of the transmission channels. These circuits act upon the volume range or dynamic swing of voice signals. That is, the compressors reduce the volume range of input signals introduced into transmission channels and the expandors restore the original volume range to output signals extracted from these transmission channels. The characteristic noise of these transmission channels occurs in the volume range eliminated by the compressors. Thus, the signals and noises do not overlap in the transmission channels, and the transmission noise does not appear in the restored volume range of the output signal.

One exemplary use of a compandor is illustrated by a subscriber carrier telephone system. These systems generally involve a use of electronic equipment mounted on a telephone pole at a remote location and are connected to a subscriber station by only the voice line. Usually, the pole is located some distance from the nearest commercially available power source and, as a practical matter, local power is not available. Therefore, power is supplied to the equipment from the central office via the same transmission medium which carries the voice signals.

Accordingly, an object of the invention is to provide new and improved compandors. A companion object is to provide a control over compandor circuits which reduces the power requirements of such circuits.

A further object of the invention is to provide a compandor which adds a gain, instead of a loss, to the system.

In accordance with an aspect of this invention, these and other objects are accomplished by means of a compandor circuit utilizing an amplifier device having an output level set by the bias on a particular electrode of a control device. The bias is, in turn, set by a variable loss device. The loss of such device is a function of the dynamic swing of a signal; therefore, the output level of the device is increased or decreased to produce the compression or expansion of the dynamic signal swing. However, regardless of the swing, there is a gain of signal strength in the compandor.

The above mentioned and other features and objects of this invention and the manner of obtaining them will become more apparent, and the invention itself will be best understood by reference to the following description of an embodiment of the invention taken in conjunction with the accompaying drawings, in which.

Figure 1:
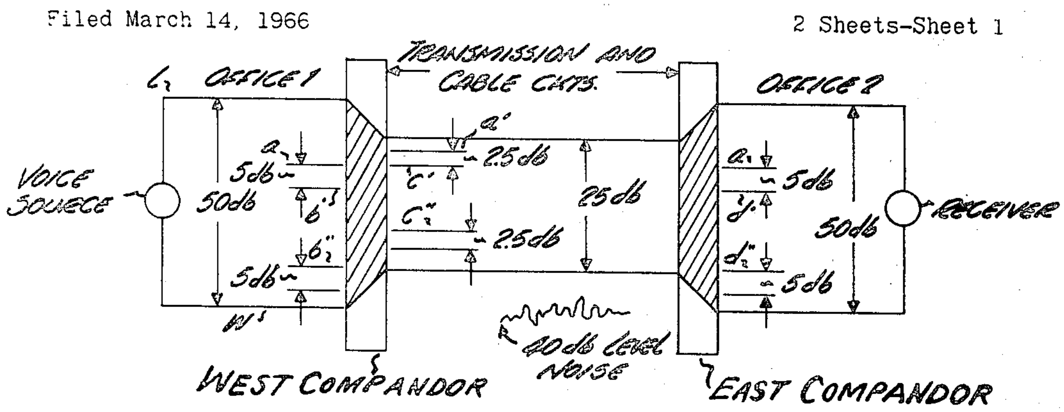
FIG. 1 is a diagram, representing signal volume swing vertically and distance horizontally, for explaining how a compandor operates.

FIG. 1 graphically shows exemplary volume range characteristics of speech transmitted in one direction through two compandor circuits. Another diagram could also be drawn parallel to that shown in FIG. 1. This other diagram would be identical to that shown in FIG. 1, except that the voice source would be at the right and the receiver at the left. This other diagram would then indicate the transmission characteristics of a channel for transmitting voice signals in a direction opposite to that shown in FIG. 1. Both the channel shown and the reverse direction channel would pass through the same compandors #1 and #2.

A here shown, a voice source provides speech signals having volume variations which swing over a range of approximately 50 db. That is, the loudest transmittable voice signals are represented at L, and the weakest transmittable signals are represented 50 db lower at W. Inside the offices, the entire 50 db range of the speech signal volume variations can be transmitted with no difficulty. However, if these same signals are transmitted to a distant office, there must be amplification to overcome line, cable, or other transmission loss. If the amplification of the system is adjusted to compensate for line loss at level L, the weak level signals W do not reach the distant office. On the other hand, if the amplification of the system is adjusted to compensate for line loss at level W, the loud level signals over-drive the amplifier and distorted signals reach the distant office.

If automatic gain control alone is used to solve the distortion problem, a low signal to noise ratio problem persists, since both the noise and low level signal are amplified. The reasons for the noise of the transmission media is not important to this invention. The important point is that this transmission noise characteristically occurs below the 40 db level. Therefore, the desired voice signal volume variations should swing over a range that ends well above the 40 db point. This way, signal and noise do not overlap in the transmission medium and the signal may be separated from the noise in the distant office, thus giving a high signal-to-noise ratio.

The compandor operates this way. All signals having a reference volume level (arbitrarily shown at *a* in FIG. 1) are transmitted without change from Office 1 over "Transmission and Cable Circuits" to Office 2. All signal volume swings above or below this reference level are compressed or changed toward the reference level in a Compressor circuit which is one-half of compandor #1. These compression changes are conventionally made in a ratio of approximately 2:1; therefore, it is arbitrarily assumed here that the circuit is designed to produce such a swing.

The Compressor circuit in the local or transmitting office changes incremental 5 db swings at *b'*, *b''*, for example, into corresponding incremental 2.5 db swings *c'*, *c''* and back into incremental 5 db swings at *d'*, *d''*. Of course, the points *b*, *c*, and *d* are arbitrarily chosen to explain the operation. The effect is continuous over the entire volume range as indicated in FIG. 1 by cross-hatching. Since the noise in the transmission and cable circuits is, perhaps, 40 db down from reference level *a* the signal and noise do not overlap within the transmitted 25 db signal. Thus, the noise does not appear in the reconstituted or expanded Office 2 signal.

According to the invention, a compandor 20 (FIG. 2) circuit is interposed between a two-wire source of signals 21 and a four-wire transmission channel 22. While the exact nature of these items is unimportant, it is here assumed that the signal source is a subscriber line, and the transmission channel is a microwave circuit. The upper half of this circuit provides the compression function and the lower half provides expansion.

The connections are made through a conventional two-to-four wire hybrid circuit 23, an output transformer 24, and an input transformer 25. Between the hybrid circuit 23 and the transmission channel 22, the voice signal is fed through a variolosser 26 and an amplifier 27. The output from amplifier 27 is fed back through a variolosser control circuit 28, comprising a coupling capacitor 29, an impedance matching resistor 30, and a power amplifying transistor 31 coupled in common emitter configuration. Interposed between the receive channel of the transmission line 22 and the hybrid circuit 23 are a variolosser 32 and an amplifier 33. The signal received over the line 22 is applied to the variolosser control circuit 34 via a winding 35 on input transformer 25, an impedance matching resistor 36, and a class B transistor amplifier 37 in an emitter follower configuration.

To prevent "singing" or system oscillation, a circuit including resistor 38 is interposed between the collector of the transistor 37 and the base of transistor 31. When a voice signal is received over the line 22, the current through the resistor 38 reduces the bias of the transistor 31 to prevent a received signal from feed out over the transmit side of the line to cause oscillation.

The control for causing the compressor and expandor operations is accomplished by the pair of variolossers 26, 32 interposed between the input and output terminals of the compandor circuit. The current in each of these variolossers changes the variolosser impedance as a function of the dynamic swing of the applied signal. These changes in impedance vary the output level of the transmit and receive amplifiers. Thus, the dynamic swing of the output signal changes as a function of the dynamic swing of the input signal to compress or expand such dynamic swing, as the case may be. However, regardless of the amount of swing, there is always a gain of signal strength in the compandor.

Figure 2:
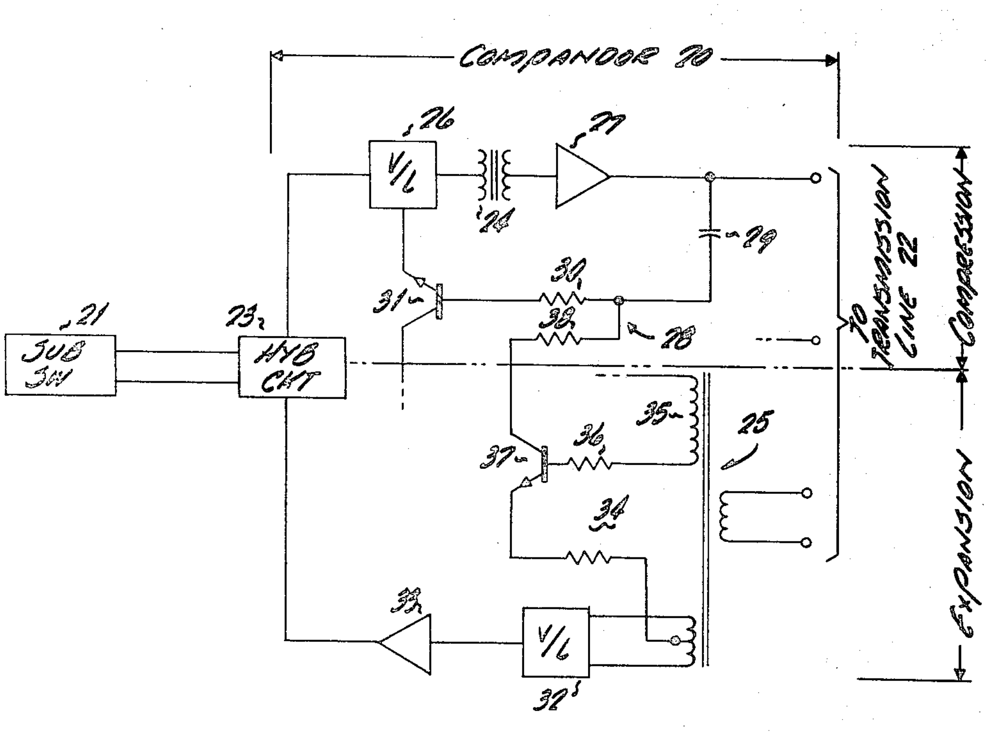
FIG. 2 is a semi-block diagram showing how the electronic circuit of the invention is used in a compandor.
Figure 3:
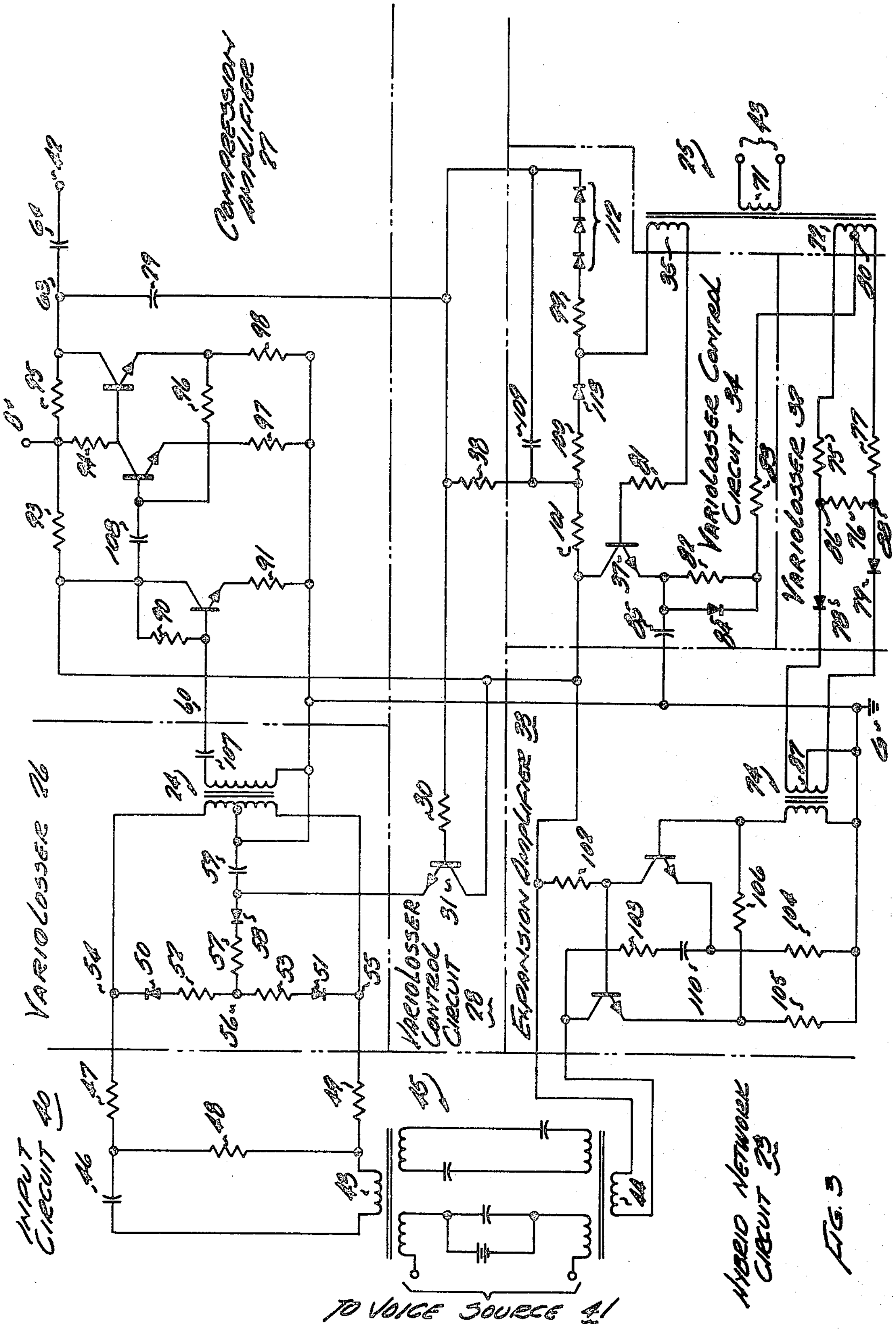
FIG. 3 is a schematic circuit diagram for the block diagram of FIG. 2.

The nature of the circuits used in FIG. 2 should be more apparent from a study of the schematic circuit diagram shown in FIG. 3. Here dot-dashed lines are used to divide the circuit into the logic parts represented by the blocks of FIG. 2.

FIG. 3 includes the hybrid network 23, and an input circuit 40 for connecting a two-way, two-wire circuit 41 to both an outgoing terminal 42 and incoming terminals 43. The variolosser 26 is connected to control the outgoing compressor amplifier 27. The variolosser 32 is used for controlling the incoming expansion amplifier 33. The amplifiers 27 and 33 are conventional devices having a plurality of cascaded transistor stages, all in common emitter configuration.

The hybrid circuit 23 includes the usual magnetics having an output winding 43, input winding 44, and a balancing network 45. A capacitor 46 and a number of resistors 47–49 match the impedance of the output winding 43 into the magnetic circuit.

The variolosser 26 includes a pair of diodes 50, 51 and a pair of resistors 52, 53. The diodes 50, 51 have impedance characteristics which vary as a function of the current through them. The term "variolosser" is well known to those skilled in the art, as meaning a device having an impedance which changes as a function of the strength of a signal applied thereto. Here, the change is current controlled.

In greater detail, the hybrid network 23 is connected through the output winding 43 to a pair of terminals 54, 55. The variolosser elements 50–53 are connected in series circuit across these terminals 54, 55. A center point 56 in the variolosser voltage divider is connected, as a common reference potential point, through a series circuit including a resistor 57, a diode 58, and a capacitor 59 to ground G. The power amplifier transistor 31 is also connected to the common reference point 56 to control the level of the voltage thereat, as a function of the output signal strength.

The variolosser diodes 50, 51 are poled to conduct in the same direction relative to the center point 56 and in opposite directions relative to the points 54, 55. Thus, diode 50 conducts and the resistor 52 is a load if point 54 is negative, relative to point 56. The strength of the output signal is, therefore, fixed by the potential at the point 54 relative to the potential at the point 56. At this same time, the potential at point 55 is positive so that diode 51 is back biased. A little later, when the A.C. signal swing reverses polarity, point 54 becomes positive, and diode 51, resistor 53 is a load. At this time, point 55 is negative, and diode 51 is conductive to allow a current flow to the point 56. When the A.C. signal is in either polarity, it is applied through one side of the transformer 24 to the input 60 of the compression amplifier 27.

Means are provided for feeding back a signal to vary the dynamic swing of the input signal as a function of the dynamic swing of the amplified output signal. In greater detail, the output signal appearing at the point 63 is applied through a coupling capacitor 64 to the transmission side of a line at terminal 42. The same output signal is also applied through a second coupling capacitor 29, resistor 30, and the base of the NPN power amplifier transistor 31. If the voltage at point 63 becomes positive, the output of the transistor 31 increases and the positive voltage of the B+ battery (less any IR drops) is applied to the point 56. If the A.C. signal swings to become more positive, the transistor 31 comes on still harder, and the point 56 swings more toward the positive potential of the B+ battery. Conversely, if the A.C. signal swings to become less positive, the transistor 31 conducts less current, and the point 56 swings away from the potential of the B+ battery. Thus, the dynamic swing of the output signal, at terminal 63, is used to compress the dynamic swing of the input signal at the input terminals 54, 55. The resistor 57 and diode 58 help reduce ambient environmental caused fluctuations in the current through the transistor 31.

The capacitor 59 controls the response time of the variolosser 26. If there is an abrupt change in the dynamic swing of the input signal, it could be either a random noise spike or an envelope change. A slight delay caused by the capacitor 59 insures immunity to the noise spike. It also helps to provide a syllabic response time.

An expandor circuit is connected to the distant end of the transmission line for restoring the dynamic swing which was extracted from the input signal by the compression circuit. Likewise, an identical expandor circuit is at the near end of this same transmission line for expanding the signals received from the distant end. Since the expandors are identical, only the near end expandor will be explained in detail.

The expandor circuit includes the transformer 25 having an input winding 71, a voice signal output winding 72, and the control signal winding 35. The voice signal induced across the winding 72 is applied through the variolosser circuit 32 to transformer 74 which couples the variolosser 32 to the expansion amplifier 33. The resistors 75–77 are interposed between the voice signal winding 72, and variolosser diodes 78, 79 to minimize the effects of transmission line impedance variations looking into the variolosser. The diodes 78, 79 are devices having an impedance which vary as a function of current through them.

The dynamic swing in the variolosser 32 is controlled by a control circuit connected between the control winding 35 and a center tap point 80 on the voice winding 72. This control circuit includes a resistor 81 which matches the impedance of the emitter follower transistor 37 to the impedance of the line 43. A circuit including the two resistors 82, 83 and a diode 84 compensate for changes in current through the transistor 37 which are caused by ambient environmental changes. The capacitor 85 delays a response by the transistor 37 for a period of time which is long enough to give the circuit a general immunity to noise spikes and to provide the desired syllabic response time.

The operation of the variolosser 32 is essentially opposite to that of the variolosser 26. That is, the variolosser 32 expands the dynamic swing of the input signal and thereby restores to the signal the dynamic characteristics which were extracted on the transmitting end of the line by a variolosser, such as 26.

In greater detail, the signal induced across the windings 71, 72 are applied through the diode 78 when the A.C. swing makes the point 86 positive relative to the point 87. At this same time, the point 88 is negative relative to the point 87 and diode 79 is reverse biased. Thus, the swing in the output signal at transformer 74 is a function of the voltage across either the upper half or the lower half of the transformers 72, 74 and the resulting current through the diodes 78, 79, respectively. The voltage swing across the upper half of the transformer 72 is, in turn, controlled by the instant potential at the point 80. The potential at the point 80 is controlled by the variolosser control circuit 34.

A control signal is induced from winding 71 to winding 35 simultaneously with the signal induced from the winding 71 into the winding 72. Since the voltages induced in windings 72, 35 are products of the same input signal in winding 71, they experience instantaneous excursions of corresponding polarity and magnitude. Thus, the signal applied through resistor 81 to the base of the transistor 37 cause it to conduct current which also varies as a function of the input signal, and the voltage at center tap 80 also varies as a function of the input signal.

The signal voltage applied across the windings of the coupling transformer 74 is, therefore, a product of the current through the transistor 37 and the variolosser diodes 78, 79. This signal is amplified at 33 and applied through the winding 44 of the hybrid network 45 and on to the subscriber station.

The nature and function of the remaining components, not previously described, should be apparent to those skilled in the art. However, so that the record may be complete, it may be well to here list all components, their values, and their functions. These particular values are, however, exemplary only.

RESISTORS

| | | |
|---|---|---|
| 30 | 110K | Impedance matching. |
| 38 | 11K | Reduce chances for oscillation by lowering compressor gain. |
| 47 | 51K | Impedance matching. |
| 48 | 24K | Do. |
| 49 | 51K | Do. |
| 52 | 30Ω | Variolosser load. |
| 53 | 30Ω | Do. |
| 57 | 560Ω | Part of current compensation circuit. |
| 75; 77 | 68Ω (each) | Equalization. |
| 76 | 20Ω | Do. |
| 81 | 110K | Impedance matching. |
| 82 | 1K | Part of current compensating circuit. |
| 83 | 500Ω | Do. |
| 90 | 300K | Negative feedback and bias. |
| 91 | 620Ω | Emitter bias. |
| 93 | 20K | Load. |
| 94 | 30K | Do. |
| 95 | 1K | Do. |
| 96 | 110K | Bias for constant current control. |
| 97 | 200Ω | Emitter bias. |
| 98 | 160Ω | Do. |
| 99 | 820Ω | Part of temperature stabilization. |
| 100 | 1.6K | Current limiting. |
| 101 | 30K | Do. |
| 102 | 7.5K | Load. |
| 103 | 33K | Negative feedback and impedance matching. |
| 104 | 560K | Bias. |
| 105 | 220Ω | Do. |
| 106 | 140K | Bias for constant current control. |

CAPACITORS

| | | |
|---|---|---|
| 29 | .02 mfd. | A.C. coupling and smoothing filter. |
| 46 | [1] | Part of hybrid impedance matching. |
| 59 | 5 mfd. | Controls response time. |
| 64 | 1 mfd. | Coupling. |
| 85 | 10 mfd. | A.C. coupling and smoothing filter. |
| 107 | 1 mfd. | Blocks D.C. |
| 108 | 4.2 mfd. | Coupling. |
| 109 | 10 mfd. | D.C. isolation between compressor and expandor. |
| 110 | .04 mfd. | |

DIODES

| | |
|---|---|
| 112, 113 | Part of a temperature stability circuit. |

[1] Depends on hybrid.

TRANSISTORS

All transistors except 31 and 37 operate as amplifiers used in a common emitter configuration. The transistors 31, 37 are biased as class B amplifiers and are used primarily as rectifiers. They are in emitter follower configuration.

While the principles of the invention have been described above in connection with specific apparatus and applications, it is to be understood that this description is made only by way of example and not as a limitation on the scope of the invention.

We claim:

1. A compandor circuit for controlling the dynamic swing of signals sent to or received from a transmission line, said compandor comprising means for amplifying output signals being sent to said line with compression of the dynamic swing of said signal, means for amplifying input signals being received from said line with expansion of the dynamic swing of said signal, first control means coupled between the output and input of said compression amplifying means for feeding back a control signal to vary the dynamic swing of said output signal inversely with said swing and thereby produce said compression, said first control means comprising a series circuit including two oppositely poled diodes separated by two resistors, said series circuit being coupled across two terminals, said first control means further comprising an electronic device having a control electrode coupled to the output of said compression amplifier and an output electrode coupled to said center tap between said resistors, means for applying said output signal across said two terminals whereby one of said diodes is conductive and the other is blocked depending upon the instantaneous polarity of the output signal swing, means for applying to the compression amplifier a signal taken from the terminal connected to the conductive diode and a center tap between said resistors, and second control means coupled between said line and said expansion amplifier for feeding forward a control signal to vary the dynamic swing of said input signal directly with said swing and thereby produce said expansion, said control and amplifying means cooperating to add a gain to said signals during both said compression and said expansion.

2. The compandor of claim 1 wherein the circuit values are such that the electronic device changes the potential at said center tap to vary the dynamic swing of the output signal in said inverse manner with respect to the potential at the output of the compression amplifier.

3. The compandor of claim 2 wherein said electronic device is a transistor coupled in an emitter follower configuration and biased to conduct as a class B amplifier.

4. The compandor of claim 1 and, a transformer having a voice winding, said transformer being coupled between said line and said second control means, said second control means comprises a parallel circuit of similarly poled diodes coupled between the ends of said voice winding and the input of said expansion amplifier, center tap means associated with said voice winding for establishing a reference potential so that one of said diodes conducts and the other blocks depending upon the instantaneous polarity of said input signal voltages appearing at the ends of said voice windings relative to said center tap.

5. The compandor of claim 4 wherein said transformer also has a control winding, said second control means further comprises an electronic device having a control electrode coupled to said control winding and an output electrode coupled to the center tap on said voice winding for establishing said reference potential.

6. The compandor of claim 5 wherein the circuit values are such that the electronic device changes the potential at the center tap of said voice winding to vary the dynamic swing of said input signal in said direct manner with respect to the signal applied to said voice winding.

7. The compandor of claim 6 wherein said electronic device is a transistor coupled in an emitter follower configuration and biased to conduct as a class B amplifier.

References Cited

UNITED STATES PATENTS

| | | | |
|---|---|---|---|
| 2,164,344 | 7/1939 | Norwine | 333—14 X |
| 2,870,271 | 1/1959 | Cronburg et al. | 333—14 X |
| 3,213,391 | 10/1965 | Kovalevski et al. | 333—14 |

ELI LIEBERMAN, *Primary Examiner.*

PAUL L. GENSLER, *Assistant Examiner.*